United States Patent [19]

Soots et al.

[11] Patent Number: 4,567,719
[45] Date of Patent: Feb. 4, 1986

[54] ATTITUDE CONTROL FOR A HARVESTER PICKUP

[75] Inventors: Daniel L. Soots, East Moline; Eugene J. Beckman, Moline, both of Ill.

[73] Assignee: Deere & Company, Moline, Ill.

[21] Appl. No.: 509,882

[22] Filed: Jul. 1, 1983

[51] Int. Cl.$^4$ .......................................... A01D 67/00
[52] U.S. Cl. ..................................... 56/364; 56/10.2; 56/DIG. 15
[58] Field of Search ............... 56/10.2, 364, 208, 10.4, 56/DIG. 15

[56] References Cited

U.S. PATENT DOCUMENTS

| | | | |
|---|---|---|---|
| 4,171,606 | 10/1979 | Ziegler et al. | 56/10.2 |
| 4,304,089 | 12/1981 | Mescheryakov et al. | 56/364 |
| 4,332,126 | 6/1982 | Van Auwelaer et al. | 56/10.2 |

OTHER PUBLICATIONS

ASAE Paper No. 81-1605, "An Automatic Pickup Header Height Controller for Combine Harvesters", K. L. Kerley et al., 1981.

Primary Examiner—Robert Peshock
Assistant Examiner—David I. Tarnoff

[57] ABSTRACT

In a combine harvester with a belt pickup platform, the attitude of the belt pickup is automatically controlled in any one of three preselected ranges by an electrical position sensor switch. The switch is mechanically actuated by connection between the pickup and its platform so as to send raise or lower signals to the electrohydraulic control system of the combine. The belt pickup is torsionally flexible and the mechanical input to the electrical position sensor switch is arranged so that the relatively higher end of the pickup controls actuation of the switch.

10 Claims, 7 Drawing Figures

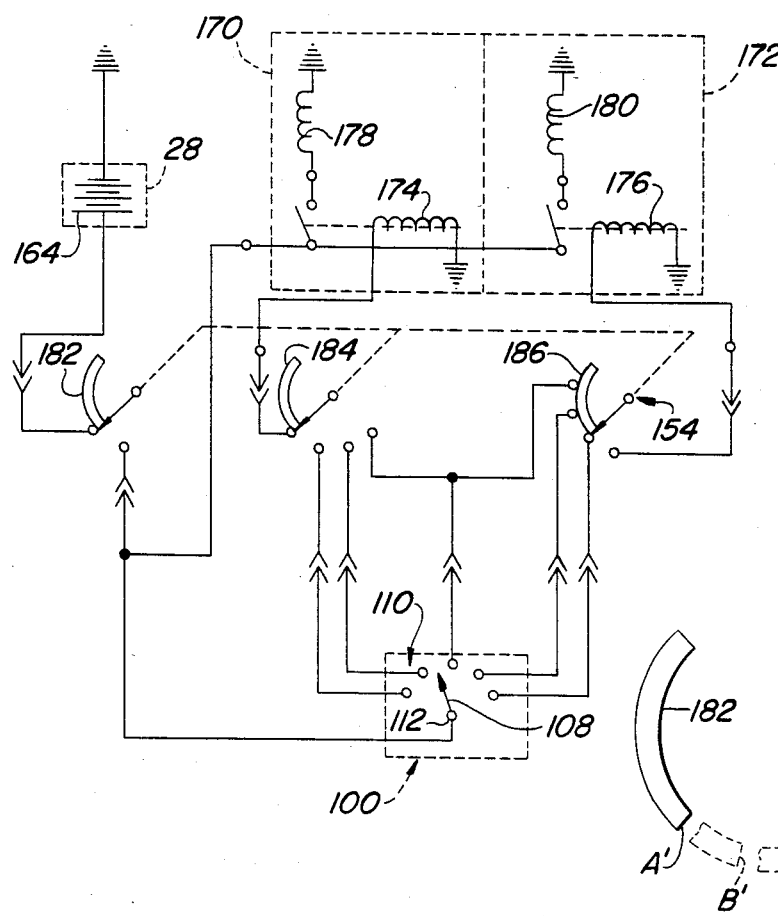
Fig. 5
Fig. 6
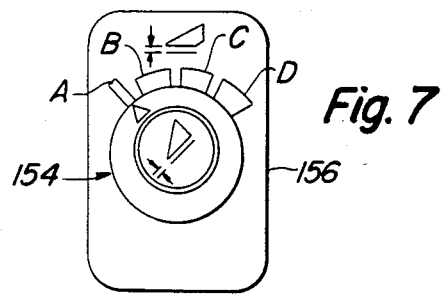
Fig. 7

# ATTITUDE CONTROL FOR A HARVESTER PICKUP

BACKGROUND OF THE INVENTION

This invention concerns generally the automatic control of vertical adjustment of a harvester header and, in particular, control so as to maintain a selected attitude in a floating forward mounted gatherer portion such as a belt pickup.

It is already known to provide automatic attitude control for a belt pickup, see for example, U.S. Pat. No. 4,171,606 Ziegler et al, also assigned to the assignee of the present invention. For efficient operation, the forward end of the belt pickup must follow the ground quite closely and conventional machines are fitted with a pair of wide-spaced gauge wheels running just ahead and outside of the forward portion of the belt. The pickup is free to pivot relative to the header about a transverse axis and also it is torsionally flexible so that the opposite ends can float independently. Normally, the belt rollers of the pickup are stiff enough that there is negligible beam deflection along the length of the pickup.

It is known to provide individual attitude sensors, one for each end of the pickup. These sensors sense deviations from an operator selected set point of the angle between the floating pickup and an auger platform portion of the header. The requirements for good function without damage to the pickup are that a signal from either end must be sufficient to raise the header whereas signals from both ends are required before the header is lowered (to ensure that, in uneven ground conditions, one end of the header is not run into the ground). However, when a pair of electrical sensors are used, the circuitry must include series connections of the sensors in the "lower" circuit and parallel connection of the sensors or their switches in the "raise" circuit. Duplication of electrical sensors and provision of the required circuitry becomes relatively expensive and the greater complication of the system makes it inherently less reliable.

SUMMARY OF THE INVENTION

Accordingly, it is an object of the invention to provide an automatic attitude control system for floating, torsionally flexible, transversely extending crop pickup portion of a header which employs only a single sensor transducer but which is responsive to changes in attitude of either or both ends of the pickup and which relies on simple mechanical means for coordinating the signals of the opposite ends of the pickup.

These objects are achieved in a preferred embodiment in which a position sensor switch is carried on the pickup and driven by a rockshaft extending through the pickup. Lost motion linkage connections between the rockshaft and the header frame adjacent the opposite ends of the rockshaft are such that relative upward pivoting movement of either end of the pickup produces a raise signal while relative downward pivoting motion of both ends of the pickup is required to produce a lower signal for the header. The linkage connection between the rockshaft and the header frame is effective to drive the rockshaft and hence the position sensor switch only in the direction of a raise signal while bias means urge the rockshaft in the direction of a lower signal.

BRIEF DESCRIPTION OF THE DRAWINGS

FIG. 5 is a simplified schematic of that part of the electrical circuitry of the combine concerned directly with automatic control of the attitude of the belt pickup.

FIG. 6 is a diagram representative of a wiper of one of the poles of the three-pole four-position rotary switch used for selecting operating attitude set point of the belt pickup, shown in its off position and, in phantom outline, its disposition in each of its other three settings.

FIG. 7 shows diagrammatically the control knob of the rotary selector switch at the operator station and the function indicating decal associated with it.

DESCRIPTION OF THE PREFERRED EMBODIMENT

Figure 1:
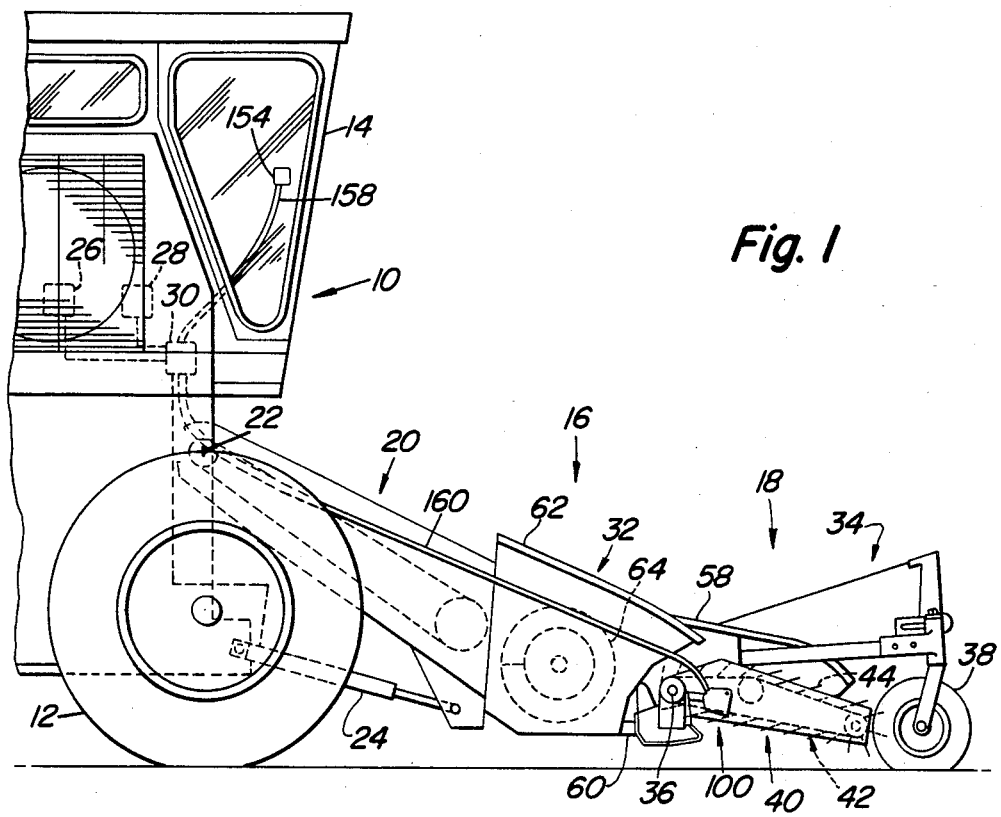
FIG. 1 is a right-hand side elevation of a harvesting header carried on a combine harvester. The header includes a feederhouse and a belt pickup platform embodying the invention.

The invention is embodied in a self-propelled combine harvester the forward portion of which is shown in FIG. 1. A mobile body 10 is supported above the ground on a pair of forward drive wheels 12 and includes a forward operator station 14 and carries a forward mounted header 16.

In this embodiment, a forward crop gatherer unit is exemplified by a belt pickup platform 18 rigidly attached to a feederhouse 20 and forming part of the header 16 which is coupled to the combine body 10 for pivoting about a transverse pivot axis 22. Vertical movement of the header 16 is controlled by a pair of side-by-side hydraulic cylinders 24 actuation of which is dependent upon sources of hydraulic and electrical power 26 and 28, respectively, and an electrohydraulic control assembly 30 all carried in the combine body 10 and shown only in simplified diagrammatic form in FIG. 1.

Figure 2:
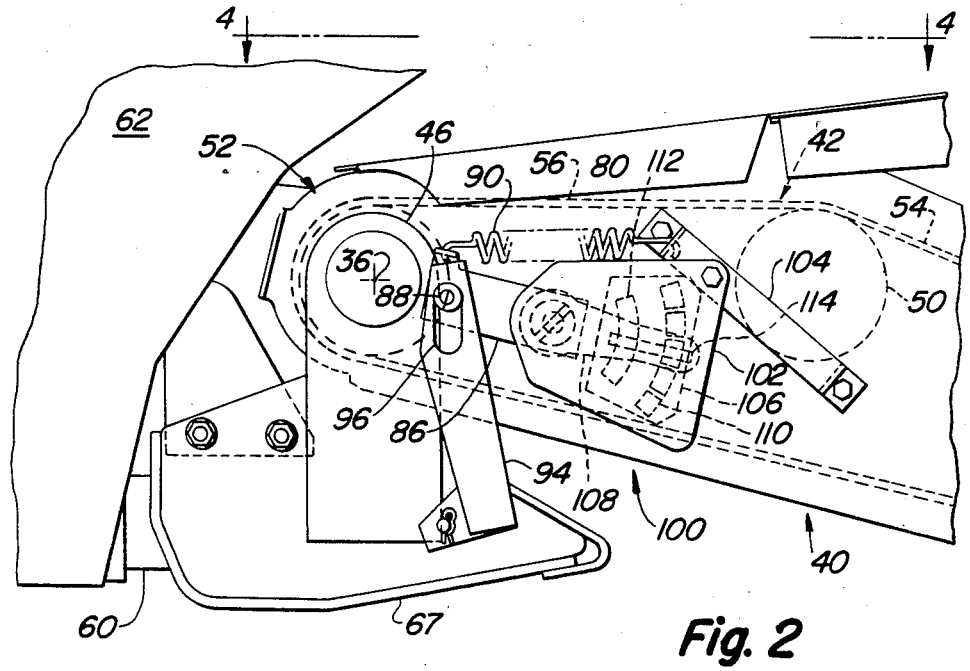
FIG. 2 is an enlarged partial view from FIG. 1 showing details of the automatic belt pickup attitude control system.

Looking at the belt pickup platform 18 in more detail and referring particularly to FIGS. 1 and 2, the structure is generally conventional except for provisions for the automatic attitude control device of the present invention. An auger platform portion 32 is attached rigidly to the lower end of the feederhouse 20 and in turn carries a floating belt pickup portion 34 which is free to pivot relative to the platform 32 about a transverse axis 36. The height above the ground of the forward end of the pickup is controlled by a pair of spaced gauge wheels 38 connected to the frame 40 of the pickup, each gauge wheel tracking close to and somewhat ahead of one of the opposite ends of the belt pickup.

The pickup belt 42 with its crop engaging fingers 44 (shown only in FIG. 1) is trained around three rigid rollers which extend the full width of the pickup (rear roller 46, forward roller 48 and center roller 50). The belt is driven by a hydraulic motor 52 through the rear roller 46 which is coaxial with the float pivot axis 36 of the belt pickup. The upper run of the belt 54, which carries the gathered crop material, slopes generally rearwardly and upwardly but the center roller 50 is offset upwards to define a generally horizontal final delivery run 56 of the belt. Flared side sheets 58 help to contain and guide gathered crop material as it is conveyed by the belt to the platform portion 32. The structure of the auger platform 32 includes a frame 60, a representative portion of which is shown in FIG. 2, and which carries a pair of opposite end sheets 62. These provide support for the platform auger 64 which receives the gathered material from the belt 42 and converges it laterally to the center of the platform for reception by the feederhouse 20 and delivery to the combine body 10 for processing. Opposite left- and right-hand skid assemblies 66, 67 respectively extend forward from the platform frame 60. They provide pivot support for the pickup portion 34 and ground engaging surfaces for maintaining the auger platform a safe height above the ground.

Looking now more closely at details of header structure directly related to operation of the automatic pickup attitude control of the present invention—efficient gathering of material from a field surface depends on controlling the height of the front of the pickup belt 42 and keeping the forward roller 48 parallel to the ground. Given that the rear of the pickup is carried rigidly connected to the combine body 10 by way of the auger platform 32, provision must be made for deflection of the forward roller 48 relative to the rear roller 46 of the pickup. This is achieved by making the structure of the pickup frame 40 torsionally deflectable. End frame members left- and right-hand 68 and 70 respectively, as well as journaling the pickup rollers, are connected by a tie assembly 72. This forms a rigid beam extending between the frame end members but it is made of left- and right-hand portions 74, 76, respectively, telescopingly connected for relative rotation about the longitudinal axis of the member. This structure permits torsional but not beam deflection in the pickup so that rotational deflection between the frame end members 68, 70 is possible. A pickup structure of this type is described in more detail in U.S. Pat. No. 4,304,089 Mescheryakov et al, hereby incorporated by reference.

Figure 3:
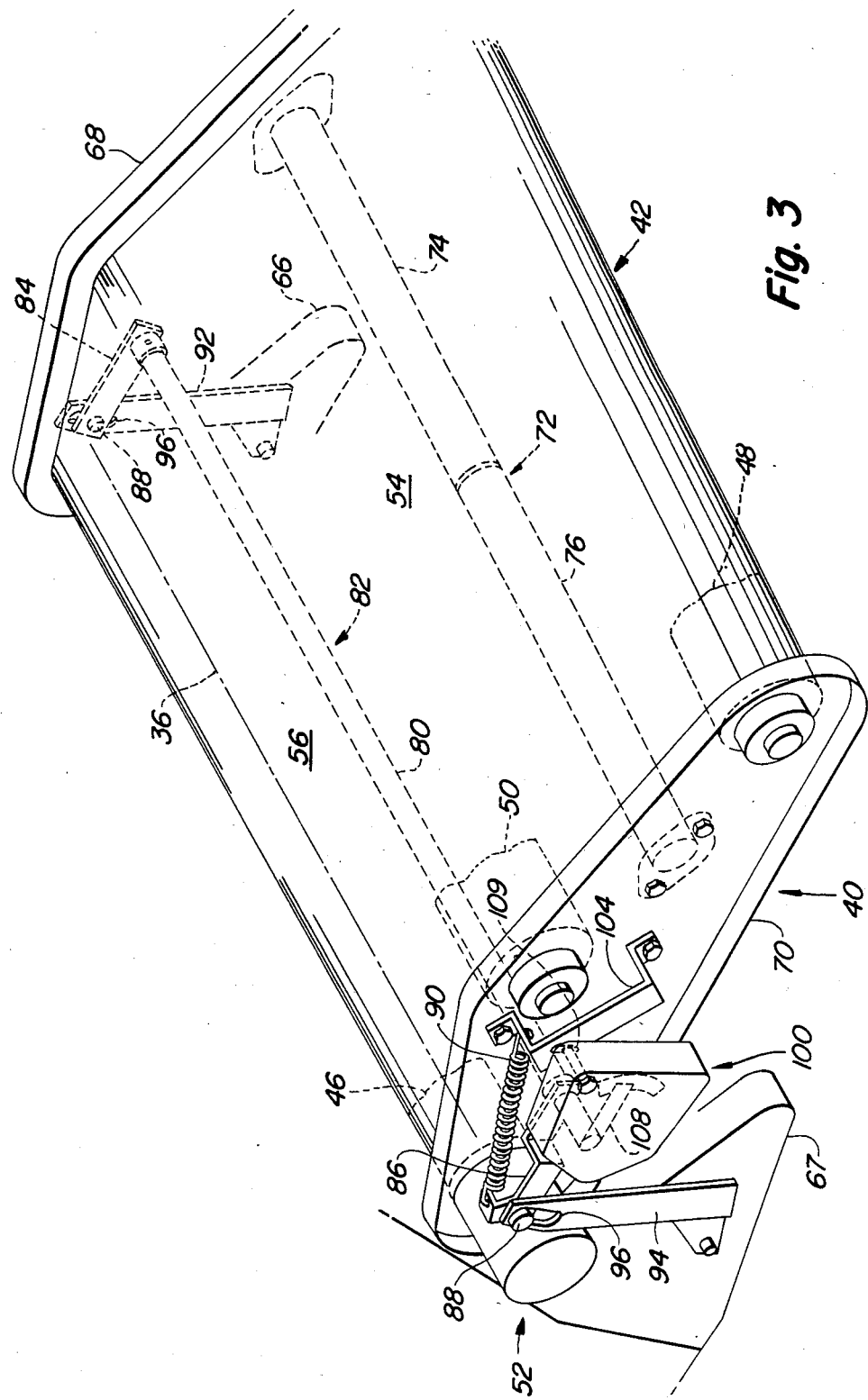
FIG. 3 is a similarly enlarged front right-hand three-quarters /isometric view of the belt pickup with parts omitted for clarity and showing the attitude control mechanism, including the mechanical means for coordinating the signals from the opposite ends of the platform.
Figure 4:
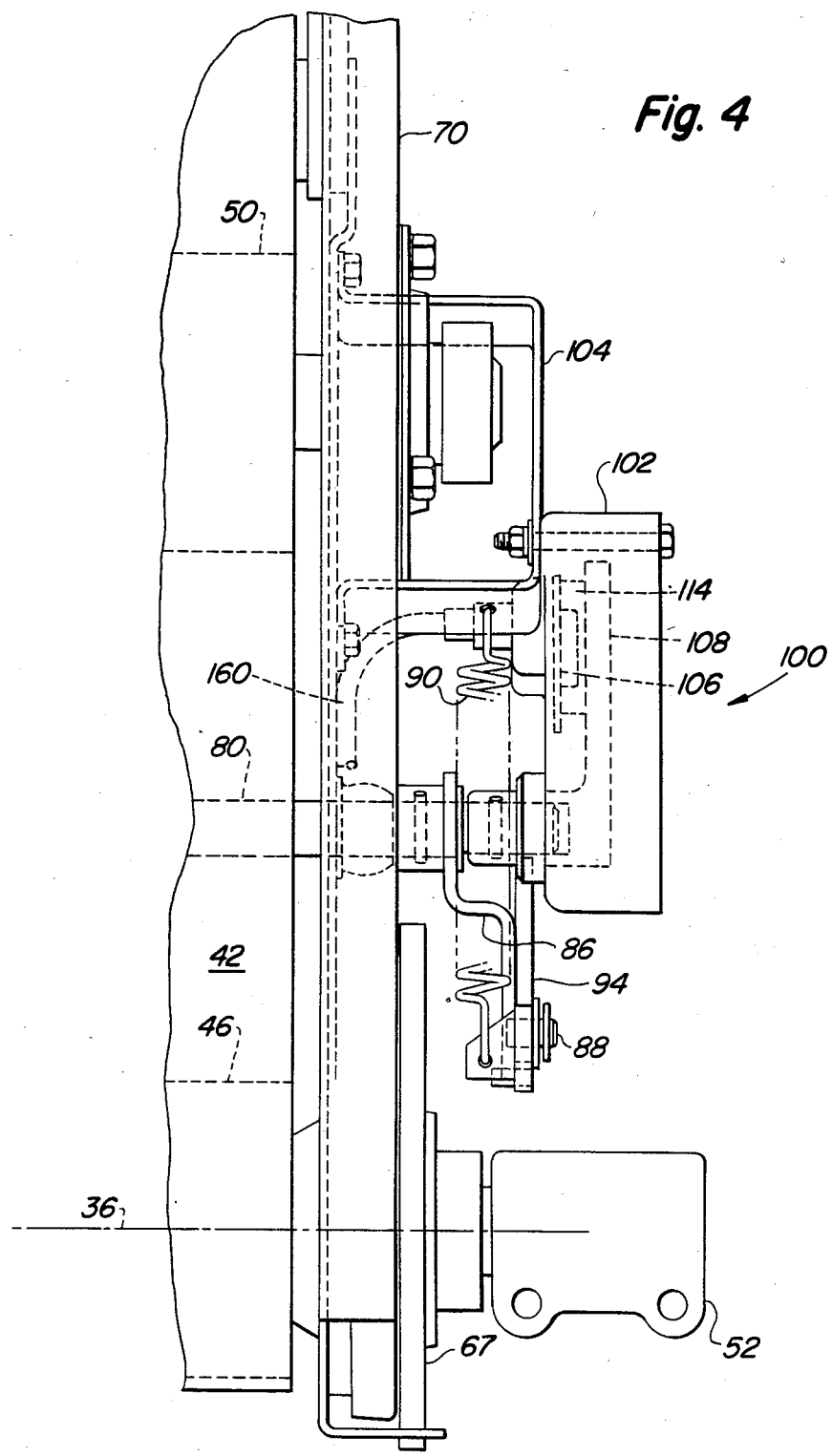
FIG. 4 is an enlarged overhead partial view taken approximately on line 4—4 of FIG. 2.

Now turning to components directly concerned with the automatic attitude control system—as seen best in FIG. 3, the shaft 80 of a position sensing rockshaft assembly 82 spans the belt pickup between the upper and lower runs of the belt 42 and is journaled in the frame end members 68 and 70. Rearwardly extending rockshaft arms 84, 86 are rigidly attached to the shaft at left- and right-hand ends respectively, externally of the frame end members 68 and 70. Each arm carries a pivot boss 88. A spring 90, connected between the right-hand rockshaft arm 86 and the right-hand frame end member 70 biases the rockshaft assembly 82 in a clockwise direction as viewed from the right-hand side of the machine. Input to the rockshaft assembly 82, determining its rotational position in the pickup is through left- and right-hand tie links 92 and 94, respectively, connected between the respective skid members 66, 67 of the auger platform and the pivot bosses 88 of the respective rockshaft arms 84 and 86. Generous slots 96 in each of the tie links 92, 94 provide for "lost motion" between the rockshaft pivot bosses 88 and the tie links in this mechanical portion of the position sensing system.

The rockshaft 80 drives directly a position sensor switch assembly 100 drivably carried on the right-hand end of the shaft. The switch assembly is held against rotation relative to the pickup by the attachment of its case 102 to a bracket 104 carried by the frame end member 70. The position sensor switch assembly 100 is of the type described in detail in U.S. Pat. No. 4,332,126 Van Auwelaer et al (sharing a common assignee with the present invention and hereby incorporated by reference) and will be described only briefly here. Fixed inside the case 102 is a circuit board assembly 106 which is swept by a wiper arm assembly 108 drivably and coaxially carried by the rockshaft 80. The circuit board includes a segmented planar array of output contacts 110 and a single common or input contact 112, the input and output contacts being electrically connectible by a brush assembly 114 carried by the wiper arm 108. Preferably, the connection of the switch body 102 to the bracket 104 is slotted (slot 109 seen in FIG. 3), permitting rotational adjustment of the switch body. This adjustment can be used to compensate for manufacturing variations or to "shift" the operating ranges of the system.

Selection of operating attitude for the belt pickup 34 relative to the auger platform 32 is made from the operator station 14 by means of a conventional three-pole four-position rotary selector switch 154. Switch positions are suitably labled by a decal indicated in FIG. 7 by the numeral 156. The switch is connected to the electrohydraulic control assembly 30 by a wiring harness 158. A second wiring harness 160 connects the electrohydraulic control assembly 30 to the position sensor switch assembly 100.

FIG. 5 represents a simplified schematic of that portion of the combine electrical system directly related to automatic control of the height or position of the header 16 responsive to the attitude of the belt pickup 34 relative to the auger platform 32. It includes the electrical power source 28 (which may for example, include a battery 164) and portions of the electrohydraulic control assembly 30, comprising a raise portion 170 and a lower portion 172 each, when suitably energized, causing the actuation of the hydraulic cylinders 24 respectively to raise or lower the header 16. The raise and lower portions 170, 172 each include switching relays (174 raise and 176 lower) and solenoid valve coils (178 raise and 180 lower). As indicated in FIG. 7, the selector switch 154 provides an off position A and three operating positions B, C, D, each corresponding to a particular operating attitude set point. The rotary selector switch 154, shown in FIG. 5, purely schematically in "exploded" form includes three coupled-together and coaxial wiper segments 182, 184, 186 (one for each pole of the switch). The relative position of each of the wiper segments corresponding to each of the four switch positions A, B, C, D, is indicated pictorally in FIG. 6 by the letters A', B', C', D'. The function performed by the switching relays 174, 176 and solenoid valve coils 178 and 180, respectively, is conventional.

The electrical function of the position sensor switch assembly 100 is also indicated schematically in the circuit schematic of FIG. 5. The appropriate wiring connections between the terminals of the components of the system (provided at least in part by the wiring harnesses 158 and 160) are included but not specifically identified in the schematic.

In operation, before advancing into a field of standing crop, the operator will have set the selector switch 154 at the operator station 14 for a given nominal pickup attitude set point. Then, by means of conventional and well-known control elements and circuitry (not shown or described here), he will lower the header 16 "manually" into the height range where the height above the ground of the forward end of the belt pickup 34 is controlled by the gauge wheels 38 and the attitude of the belt pickup 34 to the auger platform 32 is in the range where it is subjectible to automatic attitude control. On releasing the manual lift control switch or lever, the automatic system takes over. In the position sensor switch assembly 100, the wiper arm assembly 108, directly coupled to the position sensing rockshaft 80, responds to the relative attitude of the pickup 34 to move the brush assembly 114 in relation to the contacts of the printed circuit board 106, sending signals to actuate the lift system to raise or lower the header as required to maintain the selected operating attitude of the belt pickup.

Preferably, the dimensions and spacing of the group of output contacts 110 and the brush dimensions are such that, as the brush assembly 114 is carried across the contacts, electrical continuity is maintained between the common or input contact 112 and the output contacts 110. Clearly with suitable selector switching means, this arrangement of contacts in a rotary sensor switch offers a variety of options for making the output contacts selectively connectible to the header lift system for a variety of modes of response. In the present embodiment, there are five output contacts and a selector switching arrangement providing three operating attitude set points. In this system, the output contacts 110 are individually and variously connectible to the raise or lower portions 170, 172, respectively, as determined by the position of the selector switch 154 at the operator station. The circuit chosen results in the end contacts being "committed" contacts in that they are connectible only to the raise and lower portions 170, 172, respectively of the system. The three intermediate output contacts have been made uncommitted in that they are all selectively connectible either to the raise or lower portions 170, 172, respectively, of the lift system or "dead" (unconnected). This arrangement is shown in the electrical circuit schematic of FIG. 5. Contact and brush dimensions are such that when a contact is left unconnected between respective raise and lower contacts, a dead band is created corresponding to a range in which the pickup 34 can float without unnecessary signalling the system to raise or lower the crop handling portion (feederhouse 20 with attached auger platform 32).

Good pickup operation is dependent upon correct pitch or slope of the belt pickup. Raising the header and hence the platform 32 allows the pickup 34 to pivot downwards increasing its pitch; lowering the platform decreases pitch. In normal crop conditions, with the crop windrow lying on top of the stubble and off the ground, good results are obtained with a pitch such that the delivery run 56 of the belt is approximately horizontal or parallel with the ground helping to given direct and positive feeding of the platform auger 64. Other crop and ground conditions make it desirable to run the pickup at pitches both flatter and steeper than normal. For example, in a poor windrow condition with the windrow embedded in the stubble, a decreased pitch may be necessary. In rocky conditions, a steeper pitch may prevent rocks from being carried by the belt into the platform auger. Thus, in the present embodiment, position C of the rotary selector switch 154 corresponds to the normal pitch of the belt pickup. While positions B and D give operating attitude ranges corresponding to flatter pitch and steeper pitch respectively, corresponding to relatively lower and relatively higher positions respectively, of the platform portion 32.

An automatic attitude system according to the invention, works effectively even when uneven ground results in torsional deflection of the pickup portion. FIG. 3 illustrates a condition of the mechanical portion of the control system when uneven ground has caused the left-hand front portion of the pickup to be lower than the right. The bias spring 90 urging the rockshaft arms 84, 86 upwards has maintained the pivot boss 88 of the right-hand rockshaft arm 86 at the upper end of the slot 96 of the right-hand tie link 94. The relative drooping of the left-hand pickup frame end member 68 has caused a relative vertical displacement of the left-hand rockshaft arm 84 so that the left-hand rockshaft pivot boss 88 has fallen away from the upper end of the slot 96 of the left-hand tie link 92. However, there has been no relative rotational movement of the rockshaft 82 in the right-hand frame member 70 so no "lower" signal has been sent to the electrohydraulic control assembly 30. But if the right-hand end of the pickup also droops, the right-hand rockshaft arm 86 will fall relative to link 94 and the rockshaft, biased by spring 90, will be free to rotate clockwise, as seen from the right-hand side, moving the wiper arm 108 of the sensor switch assembly 100 in the direction of a "lower" signal. Thus, the lost motion feature of the system ensures that, as is desirable, no "lower" signal is sent unless both sides of the pickup move relatively lower. Conversely, from an operating condition in which the forward roller 48 is parallel with the rear roller 46 and the slack in both tie links 92, 94 is taken up, relative upward movement of either end of the pickup will result in driving the rockshaft 82 anticlockwise so as to send a "raise" signal.

Thus, it is seen that the combination of a single compact, easily mounted position sensor switch, carried on the pickup itself, in conjunction with a self-contained mechanical system which communicates position information from both ends of the pickup, provides a response which automatically maintains a preselected attitude between pickup and platform auger but which takes account of undulating ground conditions. When conditions cause torsional deflection of the belt pickup, the end which is relatively higher controls actuation of the system. The elements of the system are simple and low in manufacturing cost, easy to assemble and readily accessible for service or adjustment.

We claim:

1. In a combine harvester having an operator station and sources of electrical and hydraulic power and carrying a forward mounted header, the header having a crop handling portion pivotally attached to the combine body for relative pivoting about a first transverse axis and said portion having a frame, and including power lift means having raise and lower portions responsive to an electrical signal for controlling said pivoting of the crop handling portion, and a forward belt pickup pivotally attached to the crop handling portion for floatably pivoting about a second transverse axis so as to vary the attitude of the pickup relative to the crop handling portion, the pickup having a frame and including a pickup belt having a generally rearwardly and upwardly sloping upper run and a lower run and including ground following means adjacent each of its opposite lateral ends, and being torsionally flexible so that its respective lateral ends may pivot independently about the second transverse axis responsive to the respective ground following means, an automatic control means for controlling the attitude of the belt pickup relative to the crop handling portion comprising:

a rotational position sensing switch carried by the belt pickup and including an input contact connectible with the electrical power source and a plurality of spaced output contacts connectible with the power lift means and a first rotatable control element disposed to electrically connect the input contact to at least one of the output contacts depending upon its rotational position;

mechanical actuator means carried by the belt pickup for controlling the first rotatable control element, effective between the frame of the crop handling portion and said element and responsive to the floatable pivoting of the belt pickup and operable to dispose the first rotatable control element relative to the contacts in a position representative of the attitude of the higher of the two lateral ends of the belt pickup relative to the frame of the crop handling portion; and switching means for selectively making electrically connectible at least one first output contact to the raise portion of the power lift means for signalling it to raise the crop handling portion and at least one second contact to the lower portion of the power lift means for signalling it to lower the crop handling portion so as to define an operating attitude set point corresponding to a predetermined position of the rotatable control element relative to the contacts and hence of the belt pickup relative to the crop handling portion.

2. The automatic control means of claim 1 wherein the mechanical actuator means includes bias means for urging the rotatable control element in a first direction and wherein the actuator means is operable to displace said element, directly responsive to movement of one of the ends of the belt pickup, in a second direction only.

3. The automatic control means of claim 1 wherein the mechanical actuator means is operable to directly displace the rotatable control element responsive, independently, to upward movement of either end of the belt pickup.

4. The automatic control means of claim 1 wherein the mechanical actuator means includes a transversely disposed rockshaft spanning the belt pickup and bias means for urging the rockshaft in a first direction, each end of the shaft having a rockshaft arm engageable with the frame of the crop handling portion, said engagement being effective to rotate the rockshaft directly, in a second direction, only in response to upward movement of the belt pickup.

5. The automatic control means of claim 4 wherein the rockshaft extends through the belt pickup between the upper and lower runs of the belt.

6. The automatic control means of claim 4 wherein the first rotatable control element is rotatable coaxial with the rockshaft.

7. The automatic control means of claim 4 wherein the mechanical actuator means includes a pair of links pivotally connected to the frame of the crop handling portion, each link being coupled to a respective rockshaft arm and operable to rotate said arm only in response to upward movement of the pickup.

8. The automatic control means of claim 1 wherein the first and second output contacts are spaced so as to establish a dead band corresponding to a range in which each of the respective lateral ends of the pickup can float without signalling the power lift means.

9. The automatic control means of claim 1 wherein the output contacts of the sensing switch are in a substantially planar array and the rotatable control element comprises a wiper arm including a brush assembly for wiping the contacts and electrically connecting the input to the respective output contacts.

10. The automatic control means of claim 1 wherein the sensing switch includes a housing enclosing the contacts and the rotatable control element and the switch is mounted on the pickup frame adjacent one of its opposite lateral ends.

* * * * *